(12) United States Patent
Abraham et al.

(10) Patent No.: US 7,554,934 B2
(45) Date of Patent: Jun. 30, 2009

(54) METHOD AND APPARATUS FOR PROCESSING LOCATION SERVICE MESSAGES IN A SATELLITE POSITION LOCATION SYSTEM

(75) Inventors: Charles Abraham, Los Gatos, CA (US); Sergei Podshivalov, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 881 days.

(21) Appl. No.: 10/932,557

(22) Filed: Sep. 1, 2004

(65) Prior Publication Data

US 2006/0046747 A1 Mar. 2, 2006

(51) Int. Cl.
*H04B 7/00* (2006.01)
(52) U.S. Cl. .................. 370/310; 455/3.02; 455/427
(58) Field of Classification Search .............. 370/329, 370/335–338, 341–344; 455/414.2, 456.1, 455/456.5, 456.6, 12.1
See application file for complete search history.

(56) References Cited

U.S. PATENT DOCUMENTS

| 6,801,768 | B2 | 10/2004 | Gleyzes et al. |
|---|---|---|---|
| 6,813,500 | B1 | 11/2004 | Ciganer et al. |
| 6,944,542 | B1 | 9/2005 | Eschenbach |
| 2002/0127993 | A1 | 9/2002 | Zappala |
| 2002/0135510 | A1 | 9/2002 | Bruno et al. |
| 2003/0133423 | A1* | 7/2003 | LaDue ........................ 370/330 |
| 2004/0203824 | A1 | 10/2004 | Mock et al. |
| 2005/0020282 | A1 | 1/2005 | Pande et al. |
| 2005/0118999 | A1 | 6/2005 | Zhu |
| 2005/0153687 | A1* | 7/2005 | Niemenmaa et al. ...... 455/414.2 |
| 2005/0153706 | A1* | 7/2005 | Niemenmaa et al. ...... 455/456.1 |
| 2006/0025068 | A1 | 2/2006 | Regan et al. |
| 2006/0063534 | A1* | 3/2006 | Kokkonen et al. ........ 455/456.1 |
| 2006/0276202 | A1* | 12/2006 | Moeglein et al. ......... 455/456.1 |

OTHER PUBLICATIONS

*International Search Report* mailed Sep. 12, 2006 for PCT Application No. PCT/US05/31387.
*Written Opinion* mailed Sep. 12, 2006 for PCT Application No. PCT/US05/31387.

* cited by examiner

*Primary Examiner*—Thai D Hoang
(74) *Attorney, Agent, or Firm*—McAndrews, Held & Malloy, Ltd.

(57) ABSTRACT

Method and apparatus for processing location service messages in a satellite position location system is described. In one example, a mobile receiver includes a satellite signal receiver, wireless circuitry, and at least one module. The satellite signal receiver is configured to receive satellite positioning system signals, such as Global Positioning System (GPS) signals. The wireless circuitry is configured to communicate location service messages between the mobile receiver and a server through a cellular communication network. The location service messages may include any type of data related to A-GPS operation, such as assistance data, position data, request and response data, and the like. The at least one module is configured to provide a user-plane interface and a control-plane interface between the satellite signal receiver and the wireless transceiver. The at leat one module is capable of processing location service messages communicated using either the control-plane signaling or user-plane signaling mechanisms.

19 Claims, 4 Drawing Sheets

METHOD AND APPARATUS FOR PROCESSING LOCATION SERVICE MESSAGES IN A SATELLITE POSITION LOCATION SYSTEM

BACKGROUND OF THE INVENTION

1. Field of the Invention

The present invention generally relates to satellite position location systems and, more particularly, to a method and apparatus for processing location service messages in a satellite position location system.

2. Description of the Background Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver. The satellite positions may be obtained from satellite trajectory data broadcast by the satellites, referred to as ephemeris.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote receiver has become known as "Assisted-GPS" or A-GPS.

In some A-GPS systems, data related to location services is communicated between the server and the A-GPS receiver over a control channel of the wireless communication network ("control-plane (C-plane) signaling"). C-plane signaling, however, requires the development of an extensive network infrastructure. In addition, cellular network operators are hesitant to actively employ C-plane signaling due to the low number of A-GPS handsets currently in use.

Recently, the wireless industry has strongly considered the use of an alternative protocol for messaging. Specifically, the industry has investigated the benefits of communicating location service data between the server and the A-GPS receiver over a network data link of the wireless communication network ("user-plane (U-plane) signaling"). For example, location service data may be communicated using an internet protocol (IP). Presently, a significant number of cellular phones are designed and manufactured with IP capabilities (e.g., General Packet Radio Service (GPRS) capabilities). Thus, U-plane signaling takes advantage of pre-existing network infrastructure and simply builds on top of this existing system. Consequently, changes to the base station infrastructure software, which are used to handle location service messages, can be avoided.

Presently, A-GPS devices are manufactured to support only one of C-plane signaling or U-plane signaling. If an A-GPS device that supports one type of signaling protocol enters the service area of a cellular network that supports the other type of signaling protocol, the A-GPS device cannot receive the necessary location service messages. Accordingly, there exists a need in the art for a method and apparatus capable of processing location service messages in a satellite position location system regardless of the use of C-plane signaling or U-plane signaling.

SUMMARY OF THE INVENTION

Method and apparatus for processing location service messages in a satellite position location system is described. In one embodiment, a mobile receiver includes a satellite signal receiver, wireless circuitry, and at least one module. The satellite signal receiver is configured to receive satellite positioning system signals, such as Global Positioning System (GPS) signals. The wireless circuitry is configured to communicate location service messages between the mobile receiver and a server through a cellular communication network. The location service messages may include any type of data related to A-GPS operation, such as assistance data, position data, request and response data, and the like. The at least one module is configured to provide a user-plane interface and a control-plane interface between the satellite signal receiver and the wireless transceiver. The at least one module is capable of processing location service messages communicated using either the control-plane signaling or user-plane signaling mechanisms.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The teachings of the present invention may be readily understood by considering the following detailed description in conjunction with the accompanying drawings, in which.

To facilitate understanding, identical reference numerals have been used, where possible, to designate identical elements that are common to the figures.

DETAILED DESCRIPTION

Method and apparatus for processing location service messages in a satellite position location system is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals, such as Global Positioning System (GPS) signals.

Figure 1:
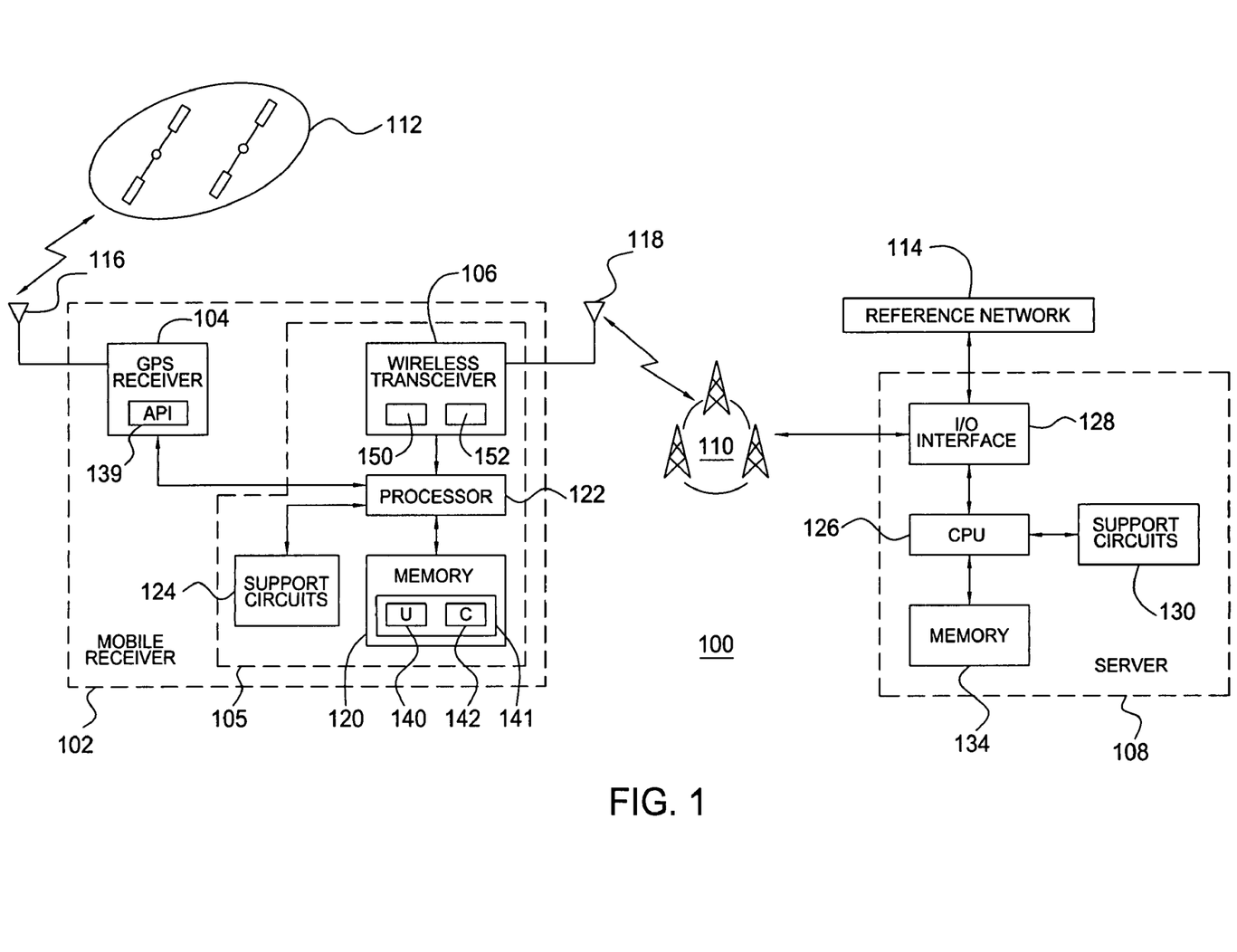
FIG. 1 is a block diagram depicting an exemplary embodiment of a satellite position location system.

FIG. 1 is a block diagram depicting an exemplary embodiment of a satellite position location system 100. The system 100 comprises a mobile receiver 102 in communication with a server 108 via a cellular communication network ("cellular network 110"). For example, the server 108 may be disposed in a serving mobile location center (SMLC) of the cellular network 110. The mobile receiver 102 obtains satellite measurement data with respect to a plurality of satellites 112 (e.g., pseudoranges, Doppler measurements). The server 108 obtains satellite navigation data for at least the satellites 112 (e.g., orbit trajectory information, such as ephemeris). Position information for the mobile receiver 102 is computed using the satellite measurement data and the satellite navigation data.

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disc storage, or any combination of such memory devices. The support circuits 130 include conventional cache, power supplies, clock circuits, data registers, I/O interfaces, and the like to facilitate operation of the server 108. Various processes and methods described herein may be implemented using software stored in the memory 134 for execution by the CPU 126. Alternatively, the server 108 may implement such processes and methods in hardware or a combination of software and hardware, including any number of processors independently executing various programs and dedicated hardware, such as application specific integrated circuits (ASICs), field programmable gate arrays (FPGAs), and the like.

Satellite navigation data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

The mobile receiver 102 is configured to receive assistance data from the server 108. In one embodiment, the assistance data comprises acquisition assistance data. For example, the mobile receiver 102 may request and receive acquisition assistance data from the server 108 and send satellite measurement data to the server 108 along with a time-tag. The server 108 then locates position of the mobile receiver 102 (referred to as the mobile station assisted or "MS-assisted" configuration). The details of such computations are well known in the art and, for purposes of clarity, are not repeated herein. In another embodiment, the assistance data comprises satellite trajectory data (e.g., ephemeris, Almanac, or some other orbit model). Upon request, the server 108 may transmit satellite trajectory data to the mobile receiver 102 via the cellular network 110. Notably, the satellite trajectory data may comprise a long term satellite trajectory model, as described in commonly-assigned U.S. Pat. No. 6,560,534, issued May 6, 2003, which is incorporated by reference herein in its entirety. Having received the satellite trajectory data, the mobile receiver 102 may locate its own position using the satellite measurement data (referred to as the "MS-Based" configuration). In addition, the mobile receiver 102 may compute its own acquisition assistance data (described above) using the satellite trajectory data.

The various data or messages communicated between the mobile receiver 102 and the server 108 are referred to herein as "location service data" or "location service messages". Location service messages may comprise assistance data (e.g., acquisition assistance data, satellite trajectory data, etc), position data, request data (e.g., position requests, assistance data requests, etc.), response data (e.g., position request acknowledgements, assistance request acknowledgements), measurement data (e.g., pseudoranges, Dopplers, etc.), and like type A-GPS data. Exemplary location service messages are described in ETSI TS 101 527 (3GPP TS 4.31).

The mobile receiver 102 illustratively comprises a GPS receiver 104 and wireless circuitry 105. The wireless circuitry 105 comprises a wireless transceiver 106, a processor 122, support circuits 124, and a memory 120. The GPS receiver 104 receives satellite signals from the satellites 112 using an antenna 116. The GPS receiver 104 may comprise a conventional A-GPS receiver. An exemplary A-GPS receiver is described in commonly-assigned U.S. Pat. No. 6,453,237, issued Sep. 17, 2002, which is incorporated by reference herein in its entirety. The wireless transceiver 106 receives cellular signals from the cellular network 110 via an antenna 118. The wireless transceiver 106 is controlled by the processor 122. The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. The support circuits 124 include conventional cache, power supplies, clock circuits, data registers, I/O interfaces, and the like to facilitate operation of the mobile receiver 102.

The GPS receiver 104 includes a software interface 139. The software interface 139 comprises an application programming interface (API), which may be used to configure and control the GPS receiver 104. The software interface 139 is configured to provide support for mobile device originated activities (e.g., mobile device originated position requests).

The wireless transceiver 106 includes a data bearer interface 150 and a control channel interface 152. The data bearer interface 150 is configured to receive and transmit data in accordance with a network protocol, such as an internet protocol (IP). For example, the data bearer interface 150 may be a General Packet Radio Service (GPRS) interface.

The control channel interface 152 is configured to transmit and receive data over one or more cellular control channels. For example, if the cellular network is a Global Systems for Mobile Communications (GSM) network, the control channel interface 152 may be configured to transmit and receive data over a stand-alone dedicated control channel (SDCCH), a fast associated control channel (FACCH), and like type GSM control channels known in the art. The control channel interface 152 may be configured for operation with well known control channels of other types of cellular networks, such as code division multiple access (CDMA), universal mobile telecommunications system (UMTS), North American time division multiple access (TDMA) (e.g., IS-136), and personal digital cellular (PDC) networks.

The mobile receiver 102 may transmit and receive location service messages via either the data bearer interface or the control channel interface. Communication of location service messages via the data bearer interface is referred to as user-plane (U-plane) signaling. Communication of location service messages via the control channel interface is referred to as control-plane (C-plane) signaling. The memory 120 stores at least one module for providing a user-plane message interface and a control-plane message interface between the GPS receiver 104 and the wireless circuitry 105. In one embodiment, the memory 120 stores a combined user-plane/control-plane module 141 for providing a message interface between the GPS receiver 104 and the wireless circuitry 105. Notably, the combined module 141 includes a U-plane module 140 and a C-plane module 142. The U-plane module 140 provides an interface between the software interface 139 of the GPS receiver 104 and the data bearer interface 150 of the wireless circuitry 105. The C-plane module 142 provides an interface between the software interface 139 of the GPS receiver 104 and the control channel interface 152 of the wireless circuitry 105. In this manner, the mobile receiver 102 is capable of processing location service messages regardless of the particular signaling protocol employed by the cellular network 110 (e.g., C-plane signaling or U-plane signaling). Although the combined user-plane/control plane module 141 is described as being implemented via software, those skilled in the art will appreciate that the combined module 141 may be implemented using hardware or a combination of software and hardware.

Figure 2:
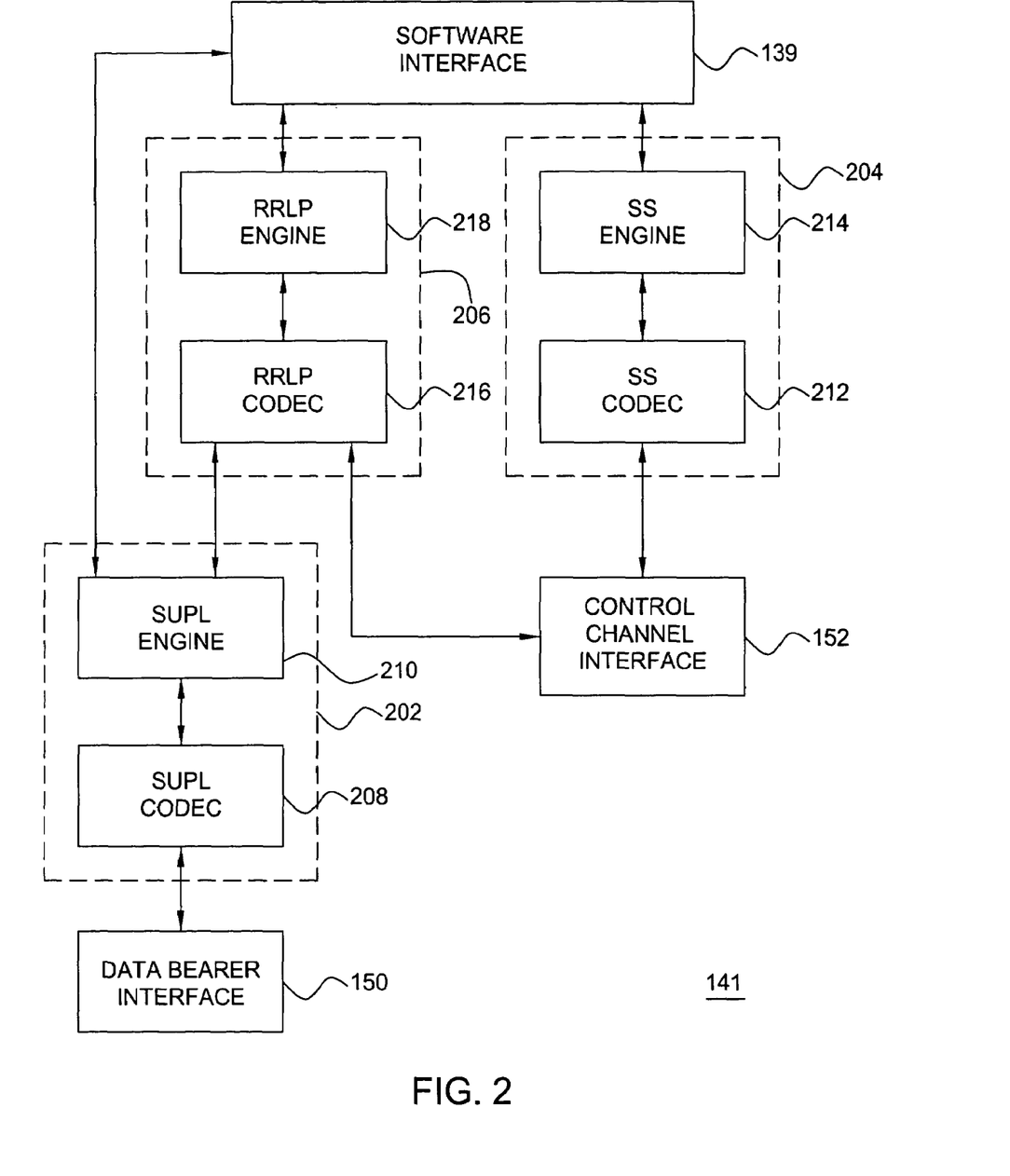
FIG. 2 is a block diagram depicting an exemplary embodiment of a combined user-plane/control plane module constructed in accordance with the invention.

FIG. 2 is a block diagram depicting an exemplary embodiment of a combined user-plane/control plane module 141 constructed in accordance with the invention. Elements of FIG. 2 that are the same or similar to those of FIG. 1 are designated with identical reference numerals. The combined user-plane/control-plane module 141 comprises a U-plane specific module 202, a C-plane specific module 204, and a common module 206. The U-plane specific module 202 and the common module 206 comprise the U-plane module 140. The C-plane specific module 204 and the common module comprise the C-plane module 142. The U-plane specific module 202 comprises a secure user plane location (SUPL) module that includes a SUPL codec 208 and a SUPL engine 210. The C-plane specific module 204 comprises a supplementary service (SS) module that includes an SS codec 212 and an SS engine 214. The common module 206 comprises a radio resource link protocol (RRLP) module that includes an RRLP codec 216 and an RRLP engine 218.

In operation, location service messages are received and transmitted by either the control channel interface 152 or the data bearer interface 150. Depending on the receiving/transmitting interface, the location service messages are processed by the U-plane module 140 or the C-plane module 142. In either case, data from the software interface 139 of the GPS receiver 104 is processed by either the U-plane module 140 or the C-plane module 142 to produce location service messages for transmission. Data is extracted from received location service messages by either the U-plane module 140 or the C-plane module 142 to produce data for driving the software interface 139.

In particular, the SS codec 212 and the SS engine 214 are configured to provide for mobile receiver originated position requests through the C-plane. That is, the SS codec 212 and the SS engine 214 allow the mobile receiver 102 to request and receive its position from the server 108. Notably, the SS codec 212 is in communication with the control channel interface 152 and the SS engine 210. The control channel interface 152 extracts SS messages from received control channel data, and formats SS messages to form control channel data for transmission over a cellular control channel. The SS codec 212 decodes the SS messages to produce SS data, and encodes SS data to produce SS messages. An exemplary coding scheme employed by the SS codec 212 is described in ETSI TS 124 080 version 5.4.0 (3GPP TS 24.080), which is incorporated by reference herein. The SS engine 210 handles the SS protocol and interfaces the software interface 139. The SS engine produces SS data in response to position requests issued by the software interface 139, and provides position data to the software interface 139 from SS data received from the server 108. An exemplary SS protocol is described in ETSI TS 124 030 version 5.1.0 (3GPP TS 24.030), which is incorporated by reference herein, as well as in 3GPP TS 24.080.

The common module 206 is configured to provide for server originated position requests in both the C-plane and the U-plane, as well as for the receipt and acknowledgment of assistance data. That is, the common module 206 allows the mobile receiver 102 to receive position requests from the server 108 and provide position information to the server 108. In addition, the common module 206 allows the mobile receiver 102 receive assistance data from the server 108 and provide an assistance data acknowledgement to the server 108.

Notably, the RRLP codec 216 is in communication with the control channel interface 152 and the RRLP engine 218. The control channel interface 152 extracts RRLP protocol data units (PDUS) from received control channel data, and formats RRLP PDUs to form control channel data for transmission over a cellular control channel. The RRLP codec 216 decodes RRLP PDUs to produce RRLP messages, and encodes RRLP messages to produce RRLP PDUs. The RRLP PDUs are in a binary bit-packed format, such as an abstract syntax notation 1 (ASN.1) format. For a detailed understanding of RRLP, the reader is referred to ETSI TS 144 031 version 5.8.0 (3GPP 44.031), which is incorporated by reference herein. The RRLP engine 218 handles the RRLP protocol and interfaces the software interface 139. The RRLP engine produces RRLP messages in response to position data, acknowledgment data, and error data issued by the software interface 139, and provides position request data and assistance data to the software interface 139 from the RRLP messages received from the server 108.

The SUPL codec 208 and the SUPL engine 210 cooperate with the software interface 139 to provide for mobile receiver originated position requests through the U-plane. In addition, the SUPL codec 208 and the SUPL engine 210 pass RRLP PDUs to the common module 206, which provides for server originated position requests in the U-plane, as well as receipt and acknowledgment of assistance data. In this manner, the common module 206 is configured for use by both the C-plane specific module 204 and the U-plane specific module 202.

The SUPL codec 208 is in communication with the data bearer interface 150 and the SUPL engine 210. The data bearer interface 150 comprises an IP layer and a transport layer, such as a user datagram protocol (UDP) transport layer, a transmission control protocol (TCP) transport layer, a hypertext transport protocol (HTTP) transport layer, and the like. That is, the data bearer interface 150 implements an IP stack capable of operating with one or more transport protocols. The data bearer interface 150 extracts SUPL messages from received IP packets and packetizes SUPL messages to form IP packets for transmission. The SUPL codec 208 decodes SUPL messages received from the data bearer interface 150 to produce protocol data (PD) messages, and encodes PD messages to produce SUPL messages. Notably, SUPL messages may be in a binary bit-packed format, such as an ASN.1 format.

The SUPL engine 210 handles the U-plane protocol and interfaces the software interface 139 of the GPS receiver 104. Notably, the SUPL engine 210 analyzes received PD messages for content. If a received PD message contains an RRLP PDU, the SUPL engine 210 extracts the RRLP PDU from the PD message and passes the RRLP PDU to the RRLP codec 216. Otherwise, the SUPL engine 210 passes the data in the received PD message to the software interface 139 (e.g., data equivalent to the SS data for the C-plane). The SUPL engine 210 packages RRLP PDUs received from the RRLP codec 216 to produce PD messages. In addition, the SUPL engine 210 packages data received from the software interface 139 to produce PD messages. For a detailed understanding of SUPL, the reader is referred to "Secure User Place Location Requirements," Draft Version 1.0, published by the Open Mobile Alliance, which is incorporated by reference herein.

Figure 3:
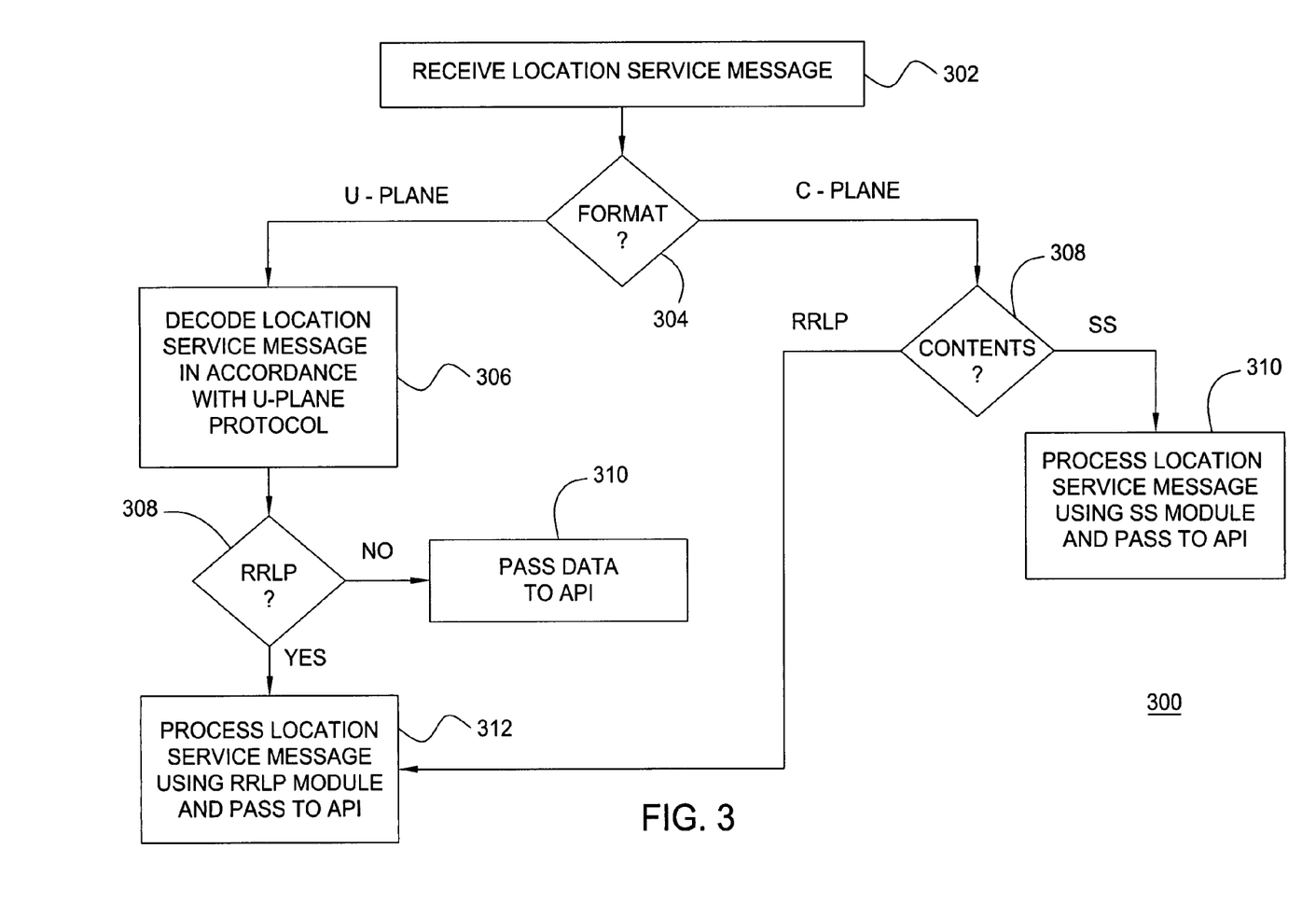
FIG. 3 is a flow diagram depicting an exemplary embodiment of a method for processing a location service message in accordance with the invention.

FIG. 3 is a flow diagram depicting an exemplary embodiment of a method 300 for processing a location service message in accordance with the invention. The method 300 begins at step 302, where a location service message is received at the mobile receiver 102 from the server 108 via the cellular network 110. At step 304, the format of the location service message is determined. If the location service message is formatted using a network protocol (i.e., U-plane signaling), the method 300 proceeds to step 306.

At step 306, the location service message is decoded in accordance with a user-plane protocol (e.g., SUPL protocol). At step 308, a determination is made as to whether the location service message includes an RRLP message. If not, the method 300 proceeds to step 310, where data from the location service message is passed to the GPS receiver API. If the location service message includes an RRLP message, the method 300 proceeds to step 312, where the location service message is processed by an RRLP module and data from the RRLP message is passed to the GPS receiver API.

If the location service message is formatted using a cellular control channel protocol (i.e., C-plane signaling), the method 300 proceeds to step 308. At step 308, the contents of the location service message are determined. If the location service message contains an SS message, the method 300 proceeds to step 314, where the location service message is processed by an SS module and data from the SS message is passed to the GPS receiver API. If, at step 308, the location service message contains an RRLP message, the method 300 proceeds to step 312, where the location service message is processed by an RRLP module and data from the RRLP message is passed to the GPS receiver API.

Figure 4:
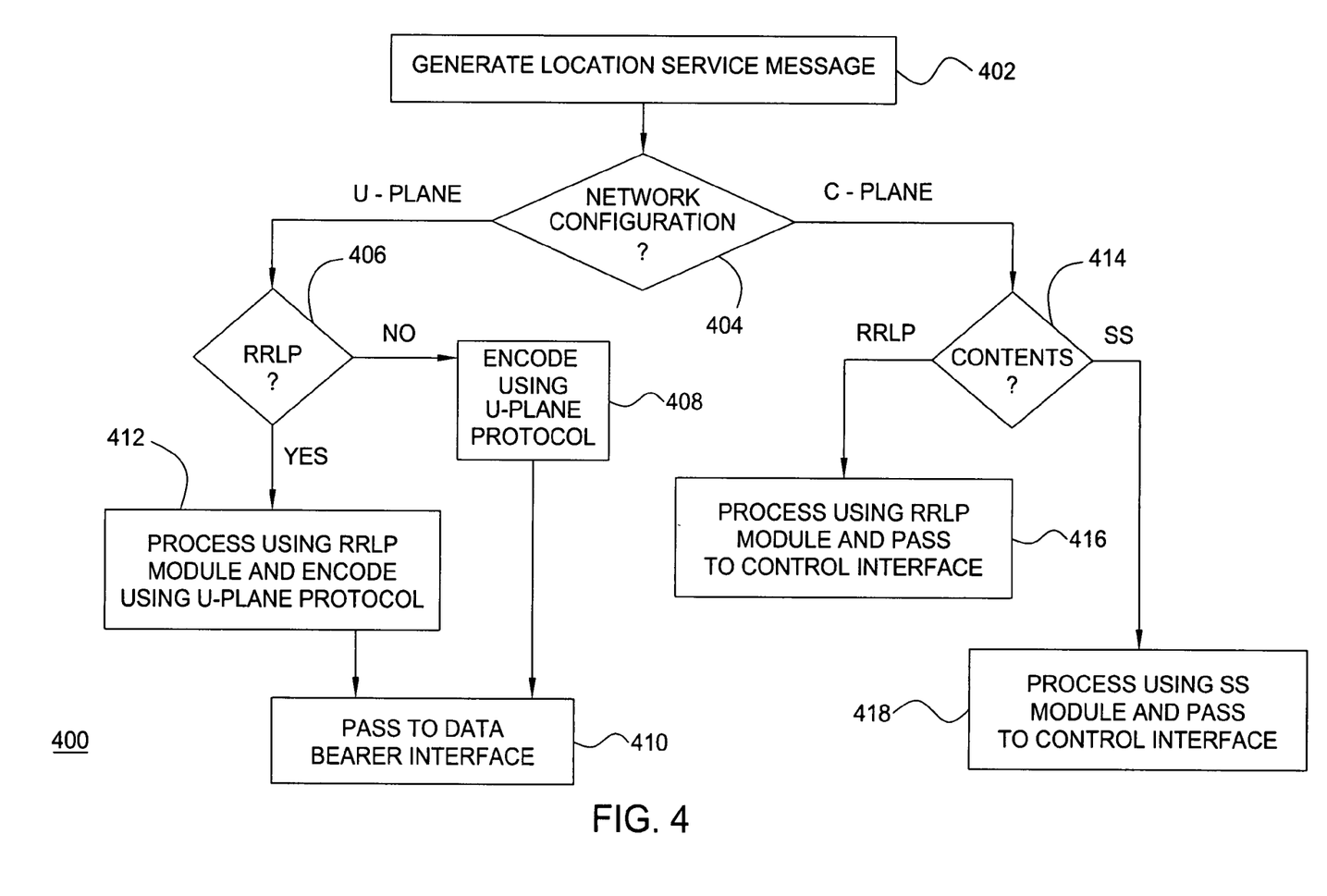
FIG. 4 is a flow diagram depicting another exemplary embodiment of a method for processing a location service message in accordance with the invention.

FIG. 4 is a flow diagram depicting an exemplary embodiment of a method 400 for processing a location service message in accordance with the invention. The method 400 begins at step 402, where a location service message is generated at the mobile receiver 102 for transmission to the server 108 via the cellular network 110. At step 404, the configuration of the cellular network 110 is determined. If the cellular network 110 is configured to communicate location service messages using a network protocol (i.e., U-plane signaling), the method 400 proceeds to step 406.

At step 406, a determination is made as to whether the location service message includes an RRLP message. If not, the method 400 proceeds to step 408, wherein the location service message is encoded in accordance with a U-plane protocol (e.g., SUPL protocol). At step 410, the encoded data is passed to the data bearer interface. If, at step 406, the location service message includes an RRLP message, the method 400 proceeds to step 412. At step 412, the location service message is processed by an RRLP module and the RRLP message is encoded in accordance with the U-plane protocol. The method 400 then proceeds to step 410.

If, at step 404, the cellular network 110 is configured to communicate location service messages using a cellular control channel protocol (i.e., C-plane signaling), the method 400 proceeds to step 414. At step 414, the contents of the location service message is determined. If the location service message includes an RRLP message, the method 400 proceeds to step 416, where the location service message is processed by an RRLP module and passed to the control channel interface. If the location service message includes an SS message, the method 400 proceeds to step 418, wherein the location service message is processed by an SS module and passed to the control channel interface.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

What is claimed is:

1. A mobile receiver, comprising:
   a satellite signal receiver for receiving satellite positioning system signals;
   wireless circuitry for communicating location service messages between said mobile receiver and a server through a wireless communication network; and
   at least one module for providing a user-plane interface and a control plane interface between said satellite signal receiver and said wireless transceiver;

wherein said wireless circuitry comprises:
  a data bearer interface for processing location service messages formatted using a network protocol; and
  a control channel interface for processing location service messages formatted using a cellular control channel protocol.

2. The mobile receiver of claim 1, wherein said at least one module comprises:
  a user-plane specific module in communication with said data bearer interface;
  a control-plane specific module in communication with said control channel interface; and
  a common module in communication with each of said user-plane specific module and said control-plane specific module.

3. The mobile receiver of claim 2, wherein said satellite signal receiver includes an application programming interface (API) in communication with said user-plane specific module, said control-plane specific module, and said common module.

4. The mobile receiver of claim 3, wherein said common module comprises a radio resource link protocol (RRLP) module having an RRLP codec in communication with each of said user-plane specific module and said control-plane specific module and an RRLP engine for providing and interface between said RRLP codec and said API.

5. The mobile receiver of claim 3, wherein said user-plane specific module comprises a secure user plane location (SUPL) module having a SUPL codec in communication with said data bearer interface and a SUPL engine for providing an interface between said SUPL codec and said API.

6. The mobile receiver of claim 3, wherein said control-plane specific module comprises a supplementary service (SS) module having an SS codec in communication with said control channel interface and an SS engine for providing an interface between said SS codec and said API.

7. The mobile receiver of claim 1, wherein said control channel interface comprises at least one of a standalone dedicated control channel (SDCCH) interface and a fast associated control channel (FACCH) interface.

8. The mobile receiver of claim 1, wherein said data bearer interface comprises an internet protocol (IP) network layer and at least one of a user datagram protocol (UDP) transport layer, a transmission control protocol (TCP) transport layer, and a hypertext transport protocol (HTTP) transport layer.

9. The mobile receiver of claim 1, wherein said wireless circuitry comprises:
  a wireless transceiver;
  a processor; and
  a memory.

10. A method of processing a location service message, comprising:
  receiving a location service message at a mobile receiver from a server via a wireless communication network;
  determining whether said location service message is formatted using a network protocol or a cellular control channel protocol;
  processing said location service message using a user-plane module in response to said location service message being formatted using said network protocol, wherein processing said location service message further comprises:
    decoding said location service message in accordance with a user-plane protocol;
    processing said location service message using a radio resource link protocol (RRLP) module in response to said location service message comprising an RRLP message; and
    passing data from the location service message to an application programming interface (API) of a satellite signal receiver; and
  processing said location service message using a control-plane module in response to said location service message being formatted using said cellular control channel protocol.

11. The method of claim 10, wherein said step of processing said location service message using said RRLP module comprises decoding said RRLP message.

12. The method of claim 10, wherein said step of processing said location service message using a control-plane module comprises:
  processing said location service message using a radio resource link protocol (RRLP) module in response to said location service message comprising an RRLP message;
  processing said location service message using a supplementary service (SS) module in response to said location service message comprising an SS message; and
  passing data from the location service message to an application programming interface (API) of a satellite signal receiver.

13. The method of claim 12, wherein said step of processing said location service message using said RRLP module comprises decoding said RRLP message.

14. The method of claim 12, wherein said step of processing said location service message using said SS module comprises decoding said SS message.

15. A method of processing a location service message, comprising:
  generating a location service message at a mobile receiver for transmission to a server via a wireless communication network;
  determining whether said wireless communication network is configured to communicate location service messages using a network protocol or a cellular control channel protocol;
  transmitting said location service message using a user-plane module in response to said wireless communication network being configured to communicate location service messages using said network protocol, wherein transmitting said location service message using said control-plane module comprises obtaining said location service message from an application programming interface (API) of a satellite signal receiver;
  transmitting said location service message using a control-plane module in response to said wireless communication network being configured to communicate location service messages using said cellular control channel protocol;
  processing said location service message using a radio resource link protocol (RRLP) module in response to said location service message comprising an RRLP message;
  processing said location service message using a supplementary service (SS) module in response to said location service message comprising an SS message; and
  formatting said location service message in accordance with said cellular control channel protocol.

16. The method of claim 15, wherein said step of transmitting said location service message using said user-plane module comprises:

obtaining said location service message from an application programming interface (API) of a satellite signal receiver;

processing said location service message using a radio resource link protocol (RRLP) module in response to said location service message comprising an RRLP message;

encoding said location service message in accordance with a User-plane protocol; and formatting said location service message in accordance with said network protocol.

17. The method of claim 16, wherein said step of processing said location service message using said RRLP module comprises encoding said RRLP message.

18. The method of claim 15, wherein said step of processing said location service message using said RRLP module comprises encoding said RRLP message.

19. The method of claim 15, wherein said step of processing said location service message using said SS module comprises encoding said SS message.

* * * * *